Patented July 4, 1939

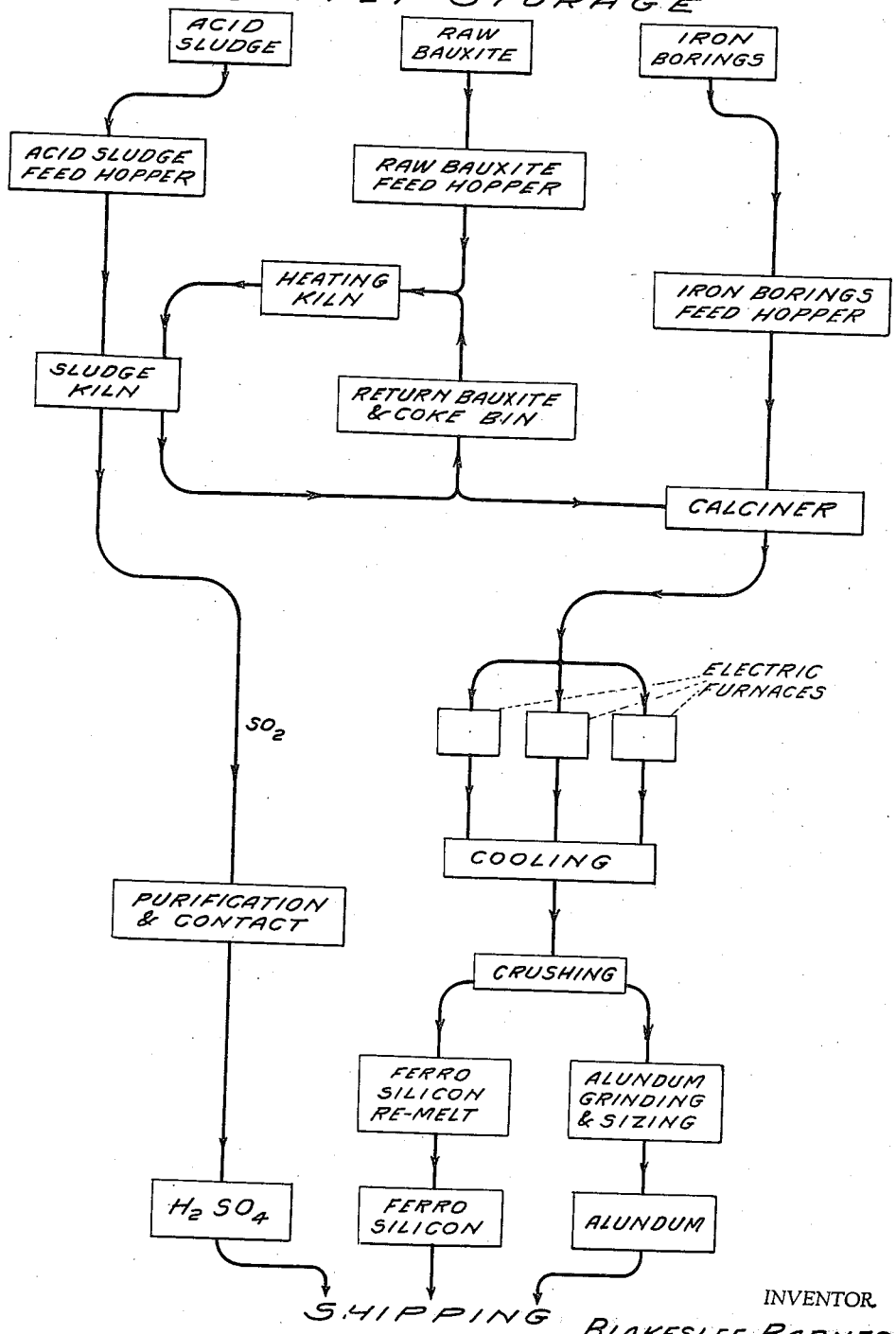

2,165,173

UNITED STATES PATENT OFFICE 2,165,173

IMPREGNATION OF BAUXITE

Blakeslee Barnes, New York, N. Y., assignor to Chemical Construction Corporation, New York, N. Y., a corporation of Delaware Application September 22, 1937, Serial No. 165,046

8 Claims. (Cl. 23—142)

This invention relates to the impregnation of bauxite with a finely divided carbonaceous reducing agent, preferably in the form of finely divided carbon.

In my copending application Serial No. 165,045, filed concurrently herewith I have described a method of manufacture of fused aluminum oxide (also known under the proprietory trade name 'Alundum') by fusing bauxite which has been impregnated with a finely divided reducing agent. The present invention relates to one method of preparing impregnated bauxite which is especially adapted for use in that process, but which also may be used for any other purposes to which its novel properties may be adapted.

An object of the invention is to obtain a calcined bauxite impregnated with a carbonaceous reducing agent by a new and economical method. A further object is to obtain a calcined bauxite impregnated with coke produced by the thermal decomposition of acid sludge from the sulfuric acid refining of mineral oils. A still further object of the invention is to obtain calcined and impregnated bauxite in which the heat necessary for calcination and decomposition of the reducing agent in the pores of the bauxite is obtained from the burning of coke produced by the decomposition of acid sludge. Other objects will become apparent from the following specification and will be pointed out in the appended claims.

I have found that a particularly good grade of impregnated bauxite for use in the manufacture of 'Alundum' by the process described in my copending application above referred to is obtained when finely divided bauxite is used as a heating medium in the decomposition of acid sludge. This material is obtained as a by-product in the sulfuric acid refining of mineral oils, and its decomposition for the recovery of sulfur dioxide and sulfuric acid is described in detail in United States Patent No. 2,028,713 issued January 21, 1936 to F. J. Bartholomew.

In the Bartholomew process acid sludge is decomposed by mixing in a rotary kiln with hot sand which has been heated to temperatures of 1500° F. or higher, whereby strong sulfur dioxide gas is evolved and the sludge is carbonized to coke. I have found that when bauxite is used, and preferably finely divided waste bauxite from mining, crushing and calcining processes, instead of the hot sand described by Bartholomew, the bauxite will become thoroughly impregnated with the carbonaceous constituents of the acid sludge. When the impregnated bauxite is discharged from the sludge kiln and recirculated through a heating kiln, as described for sand in the Bartholomew patent, these carbonaceous constituents are still further decomposed and the pores of the bauxite are uniformly and thoroughly impregnated with a carbonaceous reducing agent consisting almost entirely of finely divided carbon. The same bauxite may be recirculated several times without decomposition through a cycle including first a heating step and then a sludge decomposition step, until it has taken up the amount of finely divided carbonaceous reducing agent desired for use in the manufacture of fused aluminum oxide.

It is quite surprising that bauxite is capable of impregnation with acid sludge without decomposition for it would be expected that the sulfuric and sulfonic acids present in the acid sludge would attack the alumina of the bauxite and convert it to aluminum sulfate which is worthless for 'Alundum' manufacture. Actual tests have shown, however, that there is no attack on the alumina by the sludge. I believe this stability of the alumina is due in part to the calcined condition of the bauxite resulting from its preheating and in part to the protective action of the organic constituents of the acid sludge, but irrespective of the reasons therefor I have found that a grade of impregnated bauxite that is especially well suited for the manufacture of 'Alundum' can be obtained by first using it as the heating medium in the Bartholomew process.

The invention will be described in greater detail with reference to the accompanying drawing which is a flow sheet showing in diagrammatic form the various steps of a preferred modification of the process. The bauxite is preheated in a heating kiln to temperatures above those necessary for decomposition of the sludge, (i. e. above about 420° F., but preferably much higher) and is then mixed with acid sludge, preferably in a rotary kiln and in a ratio of 3–4 parts of the bauxite to one part of the sludge. The decomposition of the sludge takes place very rapidly and a fine mixture of bauxite and coke is produced which is discharged from the sludge kiln at about 400° F. The $SO_2$ gases evolved are drawn off to the usual purification process, after which they are mixed with air and pass over a vanadium catalyst for catalytic oxidation to $SO_3$ which is absorbed in strong sulfuric acid for the production of $H_2SO_4$ or oleum.

The mixture of bauxite and coke is recirculated through the heating kiln where a sufficient proportion of the coke is burned with air to again raise the temperature of the mass to 1500° F. or higher. This heating step removes the volatiles from the bauxite and results in its complete impregnation with a finely divided carbonaceous reducing agent. After a suitable temperature is reached the bauxite is reintroduced into the sludge kiln, and this cycle is maintained until the repeated heating and immersion in acid sludge produces a thorough and intimate impregnation of the pores of the bauxite with a very finely divided carbonaceous reducing agent.

As is indicated on the drawing, additional raw bauxite is continuously or intermittently added to the heating kiln through a raw bauxite feed hopper, and equivalent amounts of impregnated bauxite are continuously or intermittently diverted from the cycle of recirculation at a point between the bauxite outlet of the sludge kiln and the inlet of the heating kiln. This bauxite, which is thoroughly impregnated with carbon and which is also mixed with an excess of coke from the sludge kiln, is introduced into a second calcining furnace which is exactly similar to the heating kiln, and in which it is ignited with air in the same manner. In this calcining furnace the excess coke is burned from the bauxite and its temperature is raised to as high a degree as possible, this being in the neighborhood of 1500–1800° F. Finely divided iron in the form of iron borings is also preferably added and heated in this furnace, and additional amounts of titanium or titaniferous material may be introduced if necessary to make up the correct charge. For 'Alundum' manufacture the hot calcined mixture is then introduced without cooling into the electric furnaces for fusion at temperatures of 1600–1800° C. in accordance with the process described and claimed in my copending application above referred to.

The present invention presents the advantages, as compared with the other methods of impregnating bauxite described in my copending application, that the heat necessary for the calcination and impregnation of the bauxite is obtained by the combustion of coke produced in the decomposition of acid sludge and no additional fuel is required. A second advantage resides in the fact that the bauxite may be passed through the heating and sludge decomposition steps as many times as may be desired, thus obtaining a far more intimate impregnation with the carbonaceous reducing agent than is possible by other processes. Another important advantage is that the bauxite when withdrawn from the sludge decomposition process contains a large excess of acid sludge coke which is suitable for use as fuel in the calcining furnace to preheat the bauxite and iron borings to a high temperature, thus effecting a material saving in current in the electric furnace.

What I claim is:

1. A method of producing bauxite impregnated with coke which comprises heating bauxite to temperatures substantially in excess of those necessary for the decomposition of acid sludge, intimately admixing the hot bauxite with acid sludge whereby sulfur dioxide is evolved and coke is formed, and withdrawing the mixture of bauxite and coke.

2. A method of producing bauxite impregnated with a finely divided carbonaceous reducing agent which comprises heating bauxite to temperatures substantially in excess of those necessary for the decomposition of acid sludge, intimately admixing the hot bauxite with acid sludge whereby sulfur dioxide is evolved and coke is formed, withdrawing the mixture of coke and bauxite and burning out the major part of the coke.

3. A method of producing bauxite impregnated with coke which comprises maintaining a recirculating stream of finely divided bauxite through a heating step and an acid sludge decomposition step, adding fresh bauxite just prior to the heating step, and withdrawing a corresponding proportion of the bauxite and coke just after the sludge decomposition step.

4. A method of producing bauxite impregnated with coke which comprises maintaining a recirculating stream of finely divided bauxite through a cycle including a sludge decomposition step in which acid sludge is decomposed by admixture with hot bauxite and a mixture of bauxite and coke is formed and a heating step in which a part of the coke is burned from the mixture, adding fresh bauxite to the heating step and withdrawing a part of the bauxite and coke from the sludge decomposition step.

5. A method of producing bauxite impregnated with a finely divided carbonaceous reducing agent which comprises heating bauxite to temperatures in excess of those necessary for the decomposition of acid sludge, intimately admixing the hot bauxite with acid sludge whereby sulfur dioxide is evolved and coke is formed, recirculating a part of the bauxite and coke mixture to the heating step to provide fuel therefor, and burning another part of the bauxite and coke mixture to obtain a highly heated impregnated bauxite.

6. A method of producing bauxite impregnated with a finely divided carbonaceous reducing agent which comprises maintaining a recirculating stream of finely divided bauxite through a cycle including a sludge decomposition step in which hot bauxite is mixed with acid sludge and a mixture of bauxite and coke is formed and a heating step in which a part of the coke is burned from this mixture, adding fresh bauxite to the heating step, withdrawing a part of the mixture of bauxite and coke from the cycle after the sludge decomposition step and igniting and burning a major part of the coke from the mixture so withdrawn.

7. A method of impregnating bauxite with carbon which comprises heating calcined bauxite and acid sludge above the decomposition point of the latter, whereby $SO_2$ is evolved and carbon is formed within the bauxite pores.

8. A method of impregnating bauxite with carbon which comprises heating calcined bauxite and acid sludge above the decomposition point of the latter, whereby $SO_2$ is evolved and carbon is formed within the bauxite pores and burning out a portion of the carbon so formed.

BLAKESLEE BARNES.